(12) United States Patent
Lindström et al.

(10) Patent No.: US 9,253,711 B2
(45) Date of Patent: Feb. 2, 2016

(54) CONDITIONAL PARALLEL EXECUTION OF ACCESS STRATUM (AS) AND NON-ACCESS STRATUM (NAS) SIGNALING

(75) Inventors: Magnus Lindström, Spånga (SE); Janne Peisa, Espoo (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 846 days.

(21) Appl. No.: 12/443,944

(22) PCT Filed: Oct. 2, 2007

(86) PCT No.: PCT/SE2007/050696
§ 371 (c)(1),
(2), (4) Date: Apr. 1, 2009

(87) PCT Pub. No.: WO2008/041936
PCT Pub. Date: Apr. 10, 2008

(65) Prior Publication Data
US 2010/0197315 A1   Aug. 5, 2010

Related U.S. Application Data

(60) Provisional application No. 60/827,797, filed on Dec. 2, 2006.

(51) Int. Cl.
*H04W 72/04* (2009.01)
*H04W 48/08* (2009.01)
(Continued)

(52) U.S. Cl.
CPC ............ *H04W 48/08* (2013.01); *H04W 28/06* (2013.01); *H04W 76/02* (2013.01)

(58) Field of Classification Search
CPC ..... H04W 28/06; H04W 76/02; H04W 48/08; H04W 72/04; H04W 48/18; H04W 68/00; H04W 68/04; H04W 76/00; H04W 12/00; H04W 12/02; H04W 12/10; H04W 4/18; H04W 4/185; H04W 4/206; H04W 4/003; H04W 88/02; H04W 88/04; H04M 15/85; H04M 15/08
USPC .................................... 370/329; 455/403, 450
See application file for complete search history.

(56) References Cited

U.S. PATENT DOCUMENTS

2007/0123195 A1* 5/2007 Lv et al. .................... 455/403
2010/0195579 A1* 8/2010 Park et al. .................. 370/329

FOREIGN PATENT DOCUMENTS

JP      2009540731 A     11/2009
WO    03/017621 A1      2/2003

OTHER PUBLICATIONS

3GPP, "3rd Generation Partnership Project; Technical Specification Group Radio Access Network; Physical Layer Aspect for Evolved UTRA (Release 7)", 3GPP TR 25.814 V1.2.3, May 2006.*

(Continued)

*Primary Examiner* — Meless Zewdu
(74) *Attorney, Agent, or Firm* — Patent Portfolio Builders PLLC

(57) ABSTRACT

The present invention relates to methods and arrangements for facilitating an efficient connection setup. The present invention specifies rules for defining the signaling of connection setup messages from user equipments such as to apply one single transmission if an assigned uplink transmission grant for transmitting the connection setup messages is sufficiently large while applying separate transmissions if the size indicated in said uplink transmission grant is not sufficient. Thus, a sufficiently large grant allows a parallel execution of the connection setup messages.

18 Claims, 6 Drawing Sheets

(51) Int. Cl.
*H04W 28/06* (2009.01)
*H04W 76/02* (2009.01)

(56) References Cited

OTHER PUBLICATIONS

Control Plane Activation Procedures; Tdoc R2-062130, 3GPP TSG-RAN WG2 #54, Aug. 28-Sep. 1, 2006.
Feasibility Study for Evolved Universal Terrestrial Radio Access (UTRA) and Universal Terrestrial Radio Access Network (UTRAN) (Release 7), 3GPP TSG-RAN TR 25.912 V7.0.0, Jun. 2006.
Initial Random Access Procedure for E-UTRAN; Tdoc R2-062853, 3GPP TSG-RAN WG2 #55, Oct. 9-13, 2006.
Early Steps in the Control Plane Activation; Tdoc R2-062981, 3GPP TSG-RAN WG2 #55, Oct. 9-13, 2006.
European Search Report in corresponding European Application No. 07835281.2-1854/2070369 mailed Jun. 14, 2013.
Ericsson; Non-Synchronized random Access in E-UTRAN; 3GPP Draft; R2-061866, 3rd Generation Partnership Project (3GPP); RAN WG2; XP050141903; Jun. 27-30, 2006; pp. 1-7; Cannes, France.
Ericsson: "Random Access Procedures for LTE"; 3GPP Draft; R2-060866, 3rd Generation Partnership Project (3GPP); XP050131007; Mar. 27-31, 2006; pp. 1-7; Athens, Greece.
Panasonic: "SAE Radio Bearer Establishment procedure"; 3GPP TSG RAN WG2#43 R2-061221, 3rd Generation Partnership Project (3GPP); XP050131167; May 8-12, 2006; pp. 1-6; Shanghai, PR China.
Ericsson: "Solution for sending NAS together with RRC connection request"; 3GPP Draft; RAN WG2#56bis; R2-070053, 3rd Generation Partnership Project (3GPP); XP050133170; Jan. 15-19, 2007; pp. 1-7; Sorrento, Italy.
NTT DoCoMo; "Evolution of the Radio Interface Protocol Architecture"; 3GPP TSG RAN WG2 Adhoc; R2-051738, 3rd Generation Partnership Project (3GPP); XP050607818; Jun. 20-21, 2005; pp. 1-7; Sophia Antipolis, France.
Japanese Office Action in Japanese Patent Application No. 2009-531356 received Feb. 8, 2013.
LG Electronics Inc.; "Default SRB for initial access"; 3 GPP TSG-RAN WG2 LTE Ad-hoc; R2-061958; Jun. 27-30, 2006; pp. 1-2; Cannes, France.
Extended European Search Report in corresponding European Application No. 14 17 9687.0-1854 dated Nov. 6, 2014.

\* cited by examiner

CONDITIONAL PARALLEL EXECUTION OF ACCESS STRATUM (AS) AND NON-ACCESS STRATUM (NAS) SIGNALING

TECHNICAL FIELD

The present invention relates to a method and arrangement in a mobile communication system, in particular to the connection setup in evolved universal terrestrial radio access networks (E-UTRAN).

BACKGROUND

One of the basic functions in all types of telecommunication networks is the setup of communication connections such that a user end terminal desiring to establish a communication connection to another, remote terminal is provided with the necessary share of resources. In wireless communication systems, e.g. as illustrated in FIGS. 1a and 1b, allocation of resources implies on the one hand the allocation of radio resources in the radio access network 15a,15b and, on the other hand, resources in the core network 11a,11b. FIG. 1a illustrates a part of a Universal Terrestrial Radio Access Network (UTRAN) as specified in Release 99 of the specifications issued by the $3^{rd}$ Generation Partnership Project (3GPP). A user equipment 14a is connected via a radio connection to at least one radio base station 13a (or NodeB), where in turn several base stations are controlled by a radio network controller 12a, which also provides a connection interface to the core network 11a. FIG. 1b illustrates correspondingly a part of an evolved Universal Terrestrial Radio Access Network (E-UTRAN) as specified in Release 8 of the specifications issued by the $3^{rd}$ Generation Partnership Project (3GPP). User equipments 14b are connected to an evolved Node B (eNB) 13b, which in turn is connected to an entity 12b that is responsible for mobility management, user plane activities, and handles the necessary connections to the core network 11b.

The signalling protocols used between the network and the user equipment (terminal) are divided into Access Stratum (AS) and Non-Access Stratum (NAS) protocols. The Non-Access Stratum protocols, e.g. Session Management (SM), Mobility management (MM), are terminated in the terminal (UE) and core network (CN) and are sent transparently via the Radio Access Network (RAN). The Access Stratum protocols (e.g. Radio Resource Control (RRC), Radio Link Control (RLC), Medium Access Control (MAC)) are terminated in the UE and RAN, and are not visible in the CN. Additionally there is an Iu-like signalling between the RAN and CN which is not visible to the UE.

Connection setup is done by a random access procedure on a special channel Random Access Channel (RACH). Basically, as several users can make use of this channel it is necessary, in case of more than one access request, to resolve which user may momentarily use it. For optimization of the accessibility of the network to the user equipments it is desirable that the access procedure is performed without undue delays. The connection setup procedure as performed in UTRAN and applying a sequential approach is illustrated in FIG. 2a. The user equipment sends the "RRC Connection Request" message to the Node B and finalizes this procedure by sending a "RRC Connection Setup Complete" message after having received a "RRC Connection Setup" message from the Node B. Then, subsequently, the user equipment sends the "Initial NAS Message" and, possibly, further optional NAS Signaling and waits for a "NAS Response" message delivered via the Node B. Correspondingly, FIG. 2b illustrates the connection setup procedure as currently assumed for E-UTRAN where "RRC Connection Request" message and "Initial NAS Message" are sent in parallel.

In general it has been focused to optimize the connection setup by fastening the initial setup procedures. One means to fasten said setup is to allow a parallel execution of the RRC Connection Request procedure and the subsequent Non-Access Stratum procedures, which is shown in FIG. 2b whereas in UTRAN, as shown in FIG. 2a, RRC Connection Request and NAS signaling are performed sequentially. Thus, E-UTRAN provides a faster way of setting up a connection.

SUMMARY

Although the parallel processing of RRC Connection Request procedures and Non-Access Stratum procedures fastens the connection setup procedure it has been observed to be a problem that the size of messages to be transmitted by the Non-Access stratum procedure can vary substantially. Also, it is possible that the size of messages varies due to variations of the link quality, i.e. the size relative to the link quality/capacity can vary substantially.

Thus, when large messages need to be transmitted during connection establishment several problems may occur: The transmission occurs at a time when a potential contention has not yet been resolved, i.e. more than one user equipment may be trying to transmit on the same resource, making it difficult to use a retransmission scheme, e.g. HARQ, for enhancing reliability. Further, mandating a low rate of transmission, it is difficult to estimate the uplink quality that is suitable for all users in the cell.

It is thus the basic idea of the present invention to specify rules for defining the signaling of connection setup messages by the user equipment such as to apply one single transmission if the assigned uplink transmission grant for transmitting said connection setup messages is sufficiently large while applying separate transmissions if the size indicated in said uplink transmission grant is not sufficient. Thus, a sufficiently large grant allows a parallel execution of the connection setup messages by the user equipment.

The present invention allows usage of the advantages of a fast connection setup on the one hand while also providing a reliable fallback mechanism in cases where a fast setup is not applicable.

BRIEF DESCRIPTION OF THE DRAWINGS

FIG. 1a illustrates a part of a UTRAN as specified in Release 99 of the 3GPP-specifications while

FIG. 2a illustrates the connection setup procedure in UTRAN while

DETAILED DESCRIPTION

In order to transmit a connection setup message, a user equipment has to use the random access procedure, which generally consists of a Random Access Request sent by the user equipment and followed by a Random Access Response from the network. The Random Access Response contains a grant for an uplink transmission, whereby the size of this initial grant should be large enough to allow the transmission of the initial message by the user equipment. However, it may from the network side not be possible to exactly determine the size of the uplink grant such as to match the radio conditions and buffer status of the user equipment. First, the network is typically not able to determine the quality of the uplink accurately (or at all) based on the Random Access Request, and will therefore have to assign the initial grant based on other parameters, e.g., the estimated channel quality at the edge of the cell. Second, as the size of the initial NAS message varies, it may also be difficult for the network to allocate the uplink grant to exactly match the size of the UE initial message. Thus the network will respond (at least occasionally) with a grant that will not allow the transmission of the whole initial message.

Furthermore, it is the nature of the Random Access procedure that there may be several UEs attempting at the same time, in which case they all will receive the Random Access Response, and will all transmit the initial message at the same time, leading to a collision. For this reason, it may not be desirable to transmit large messages before possible contention of such colliding user equipments has been resolved.

Figure 4:
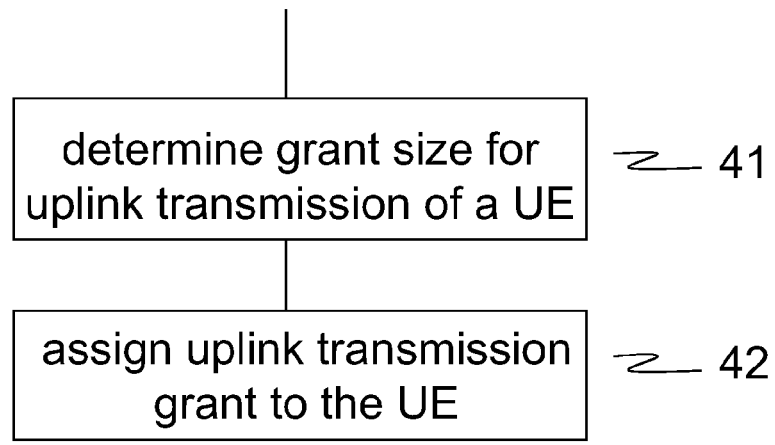
FIG. 4 illustrates the method according to the present invention for implementing said rule as performed in a node of the radio access network.

The present invention suggests implementing a rule in the user equipment such that the network, as illustrated by FIG. 4, in the Random Access Response can assign 42 a grant with a size that is autonomously determined 41 by the network node. The size of this grant can be determined 41 either statically or dynamically. A static size of the grant can be based, e.g., on the cell deployment such that, for instance, large initial grants are used in small cells in which the data rate at the cell border is large. A dynamic size determination can be based, e.g., on parameters like system load, possible information about the size of the UE message, estimated channel quality, etc.

Figure 1A:
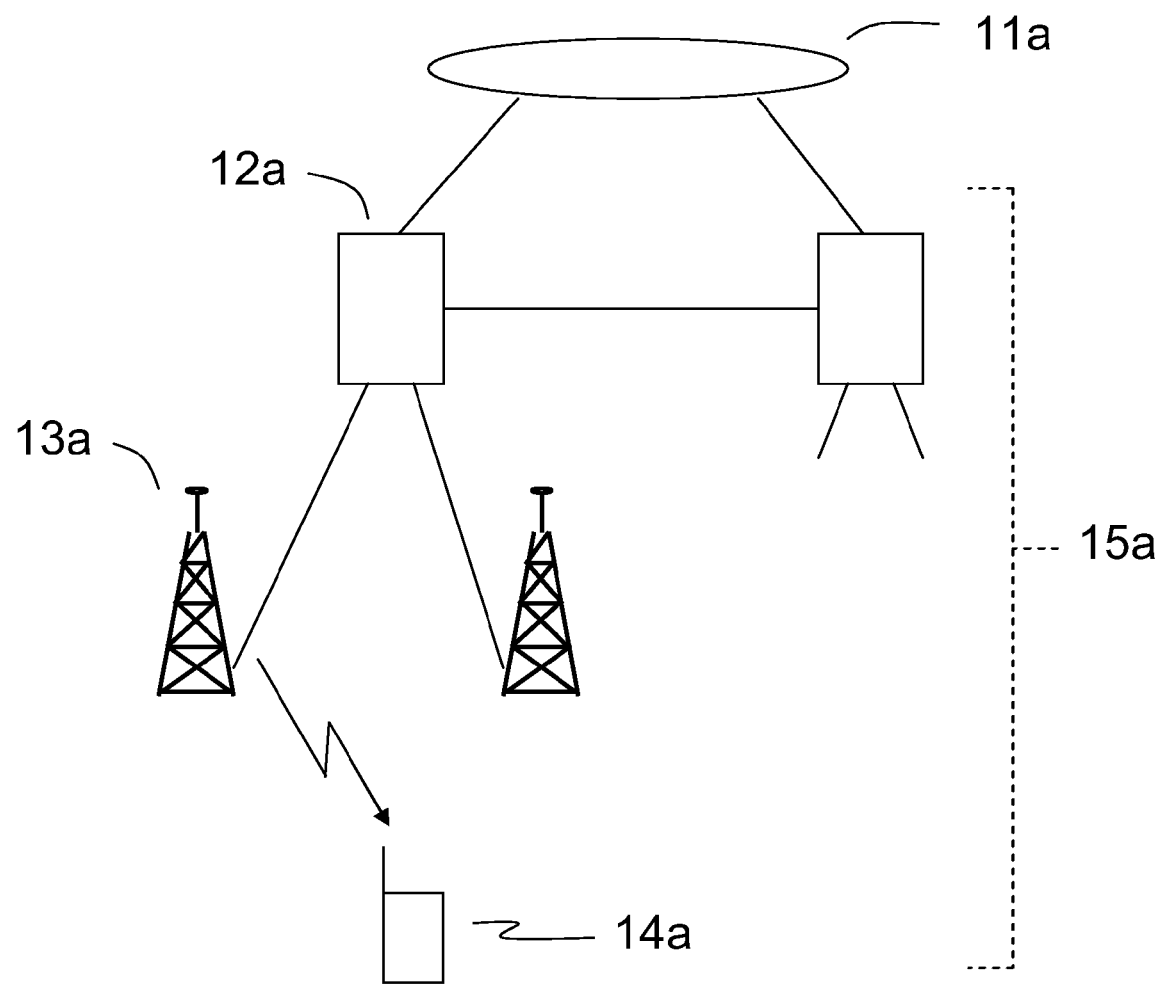
Figure 1B:
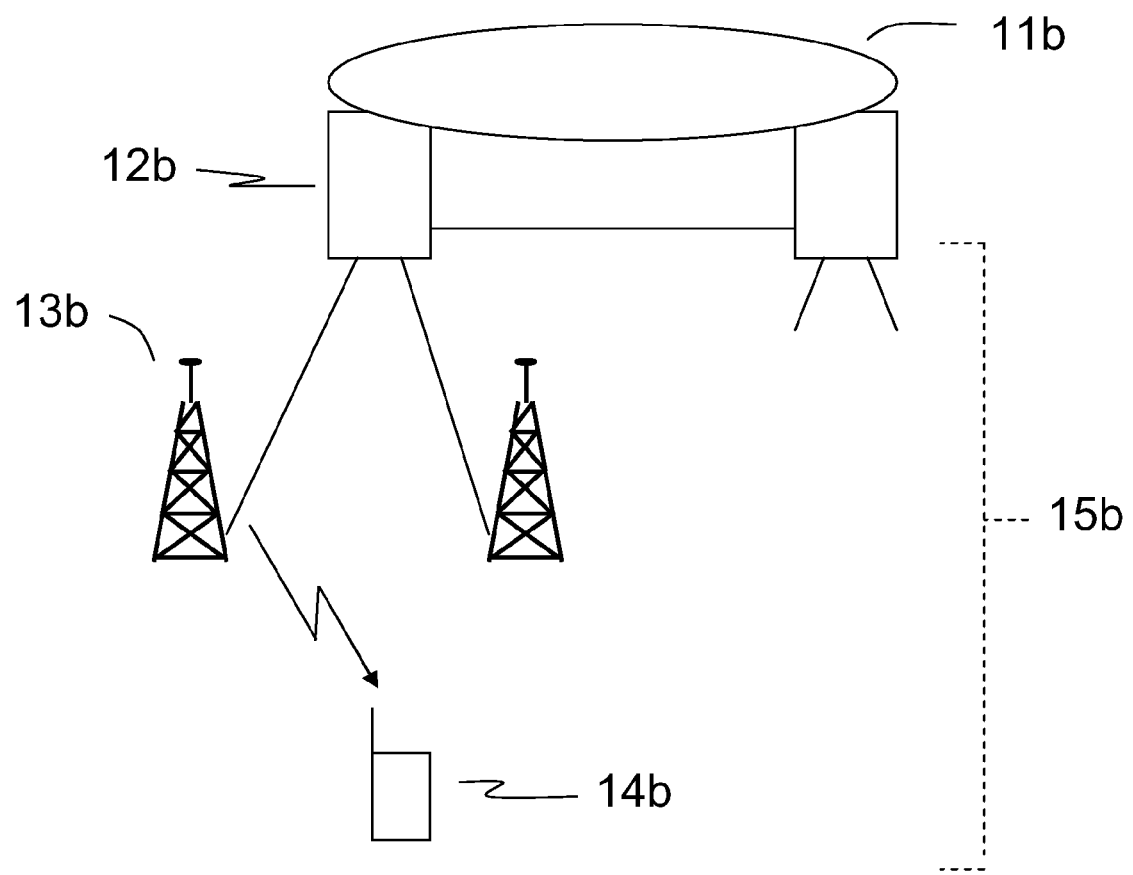
FIG. 1b illustrates a part of an E-UTRAN as specified in Release 8 of the 3GPP-specifications.
Figure 2A:
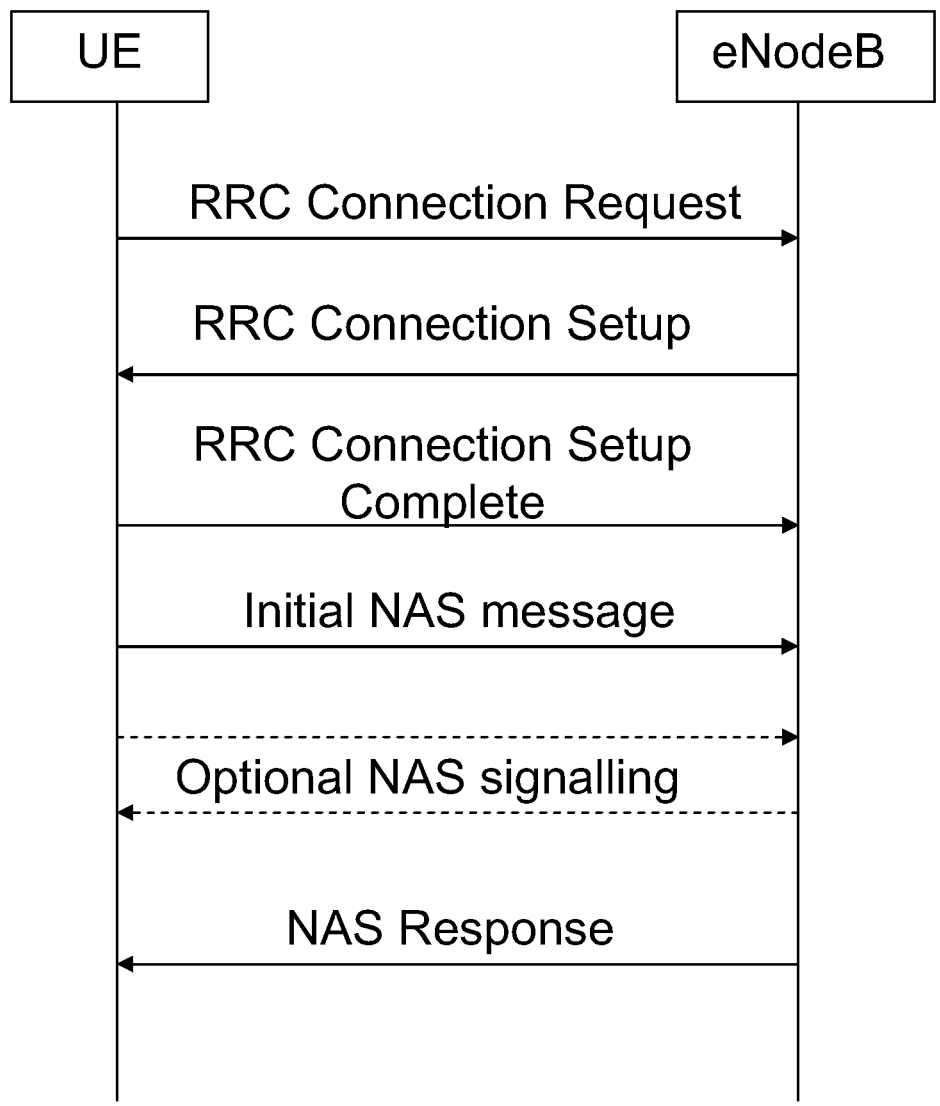
Figure 2B:
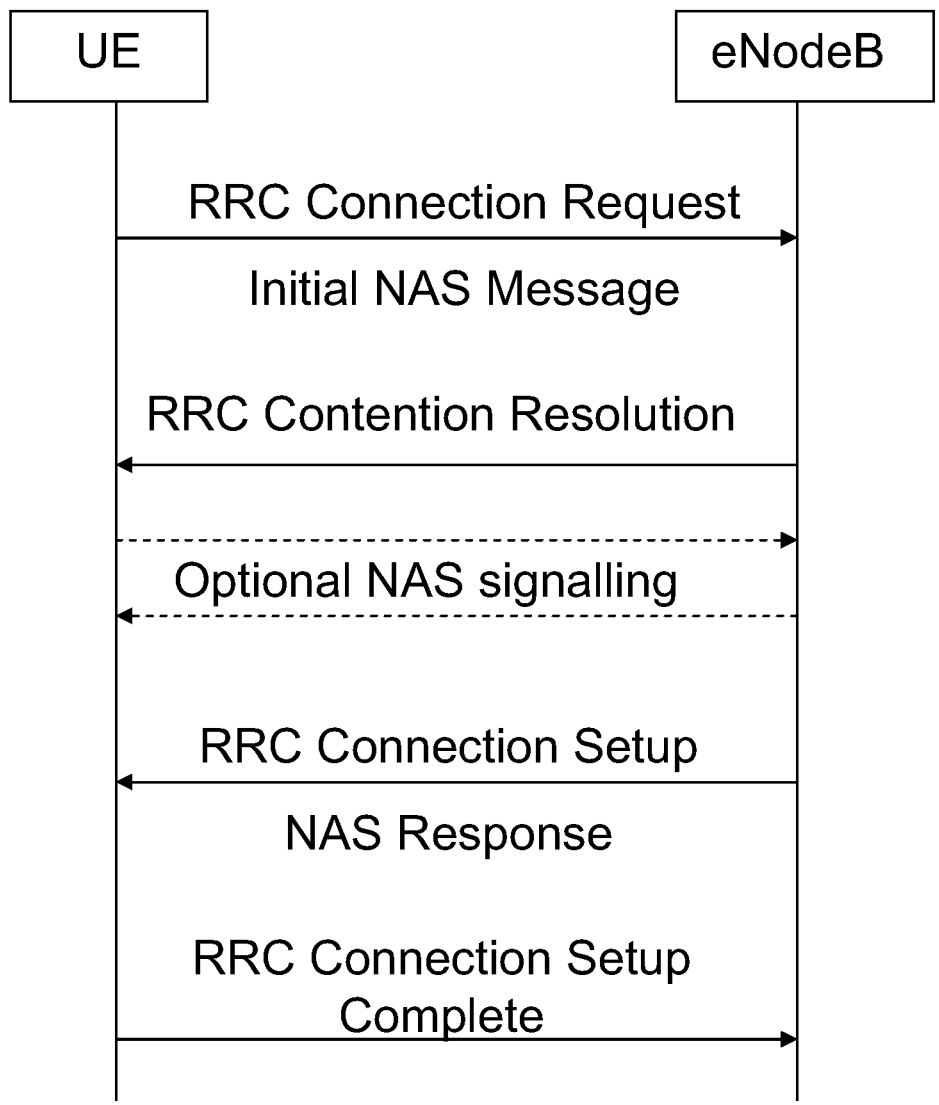
FIG. 2b illustrates the connection setup procedure in E-UTRAN.
Figure 3:
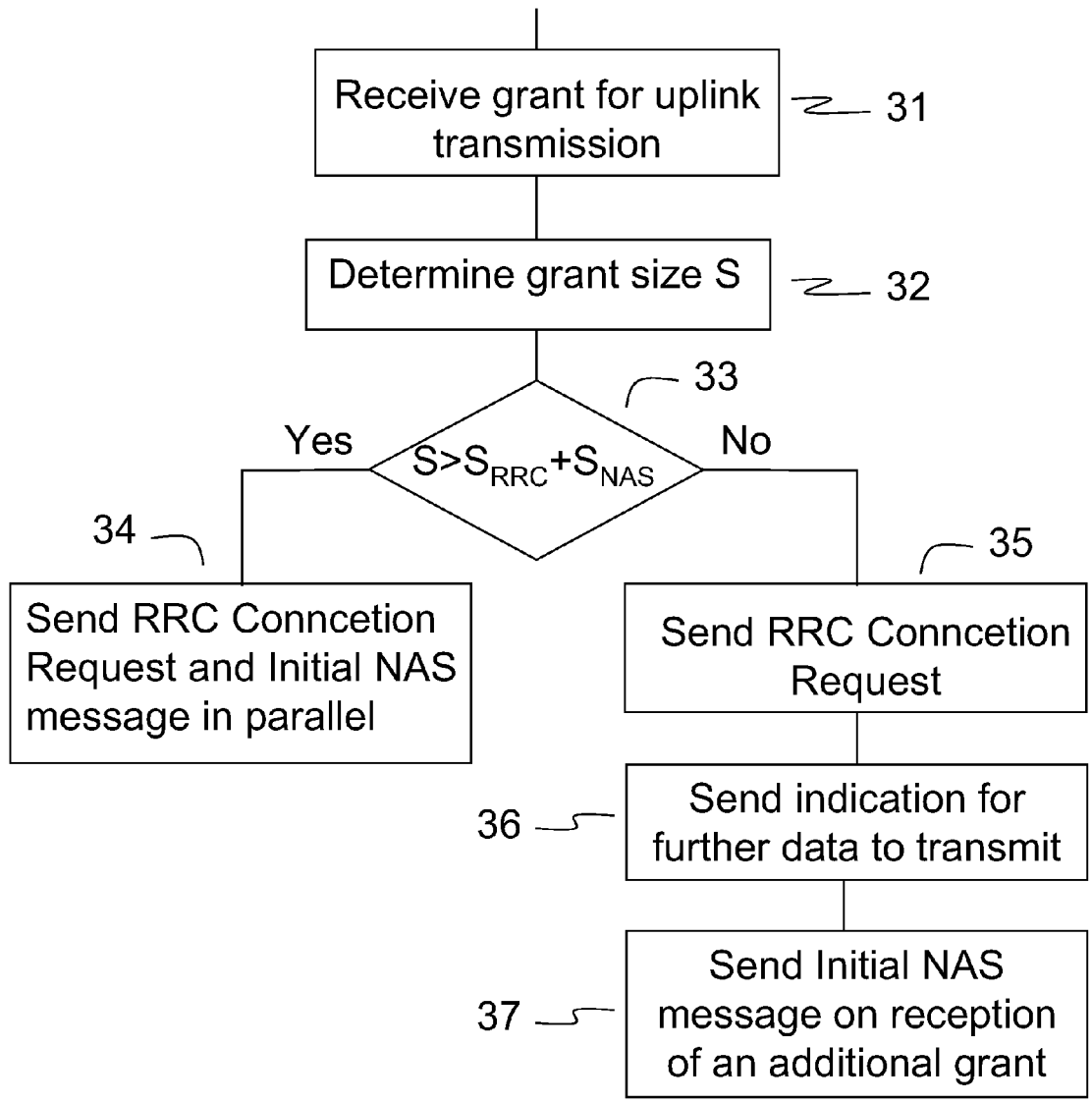
FIG. 3 illustrates the method according to the present invention performed in the UE for providing an improved connection setup.

FIG. 3 illustrates the method according to the present invention for implementing said rule as performed in the UE: Upon receiving 31 from the network a grant message for uplink transmission the UE determines 32 the size S of the grant and determines 33 whether this size allows transmission of both the RRC Connection Request with size $S_{RRC}$ and the Initial NAS message having a size $S_{NAS}$. If the grant size is large enough, 33 Yes, the UE can immediately transmit 34 both messages in parallel. If the grant is not large enough, 33 No, the UE only transmits 35 the RRC Connection Request and holds the Initial NAS message even if it would have been possible to partly transmit the NAS message. The UE indicates 36 to the network that it has further data to transmit. This can be done by means of scheduling information method or by using a normal scheduling request. According to one embodiment of the present invention, scheduling information can be enabled to be sent in the same transmission as the RRC Connection Request.

Upon receiving the RRC Connection Request message the network can, if necessary, perform a contention resolution when more than one user equipment have provided a connection request. This can be resolved, e.g., by transmitting separate contention resolution messages in the downlink. Further, if there was a scheduling request or scheduling information included in the indication message from the UE the network assigns an additional grant for the requesting UE. After having received the contention resolution message the UE can use, e.g., HARQ to improve the reliability of the transmission. The reception of the additional grant from the eNodeB finally triggers the transmission 37 of the NAS message that did not fit in the initial message.

Figure 5:
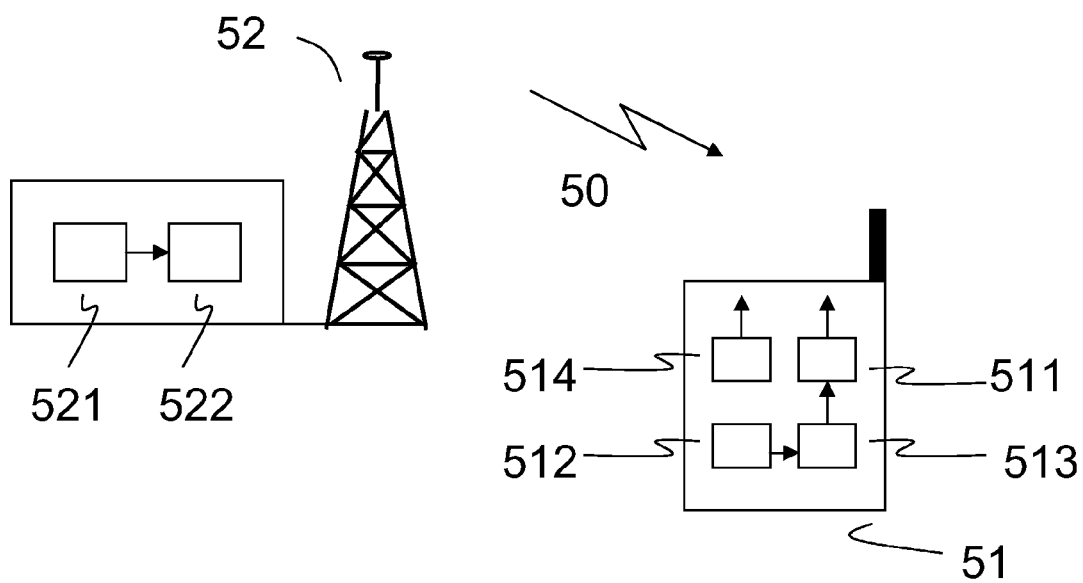
FIG. 5 illustrates arrangements in the network node and user equipment to perform the method according to the present invention.

The method according to the present invention as described above is implemented in a network node, typically the radio base station (or eNodeB), and a user equipment in a radio access network. FIG. 5 shows such a network node 52 in a radio access network 50 including a first electrical circuitry 521 that is adapted to determine the size of an uplink transmission grant to a user equipment 51, whereby said size is autonomously determined by the node based on cell-specific or load-specific parameters; and including a second electrical circuitry 522 that is adapted to assign said uplink transmission grant in a random access response to said user equipment 51. The user equipment 51 on the other hand includes a first electrical circuitry 512 that is adapted to determine the size of the assigned uplink transmission indicated by a received uplink transmission grant and a second electrical circuitry 513 adapted to initiate a parallel transmission of said RRC Connection Request and the initial NAS message if the size indicated by the initial grant allows transmission of both messages. It further comprises a transmitter part 514 that is adapted to send an indication to transmit further data if the initial NAS-message could not be transmitted in parallel to the RRC Connection Request.

The invention claimed is:

1. A method in a user equipment when setting up a communication connection in a radio access network, including the steps of:
   ascertaining, in a received initial uplink transmission grant with respect to a radio base station node, a size of the uplink transmission indicated therein;
   determining whether the size of the uplink transmission indicated by the received initial uplink transmission grant allows transmission of a Radio Resource Control (RRC) Connection Request message and an initial Non-Access Stratum (NAS) message;
   in response to a negative determination, transmitting the RRC Connection Request message and no initial NAS message to the radio base station node; and
   in response to a positive determination, transmitting in parallel the RRC Connection Request message and the initial NAS message.

2. The method of claim 1, wherein said transmitting in parallel comprises transmitting the RRC Connection Request message and the initial NAS message as two separate signals in one single transmission.

3. The method of claim 1, wherein said transmitting in parallel comprises transmitting the RRC Connection Request message and the initial NAS message in commensurate formats.

4. The method of claim 1, wherein said transmitting in parallel comprises transmitting the RRC Connection Request message and the initial NAS message in hierarchically unordered formats.

5. The method of claim 1, further comprising in response to the negative determination, transmitting an indication to transmit further data.

6. The method of claim 5, whereby said indication to transmit further data is transmitted via a scheduling request.

7. The method of claim 5, whereby said indication to transmit further data is transmitted in the same transmission as the RRC Connection Request.

8. The method in a network node of a radio access network, said network node responsible for providing a connection setup possibility to the user equipment of claim 1, the method comprising:

autonomously determining in said network node a size of a grant for uplink transmission of said user equipment based on cell-specific or load specific parameters;

assigning in a random access response said grant to said user equipment; and receiving a Radio Resource Control (RRC) Connection Request message and an indication to transmit further data.

9. The method of claim 8, whereby the network node determines the size of said grant in relation to cell size.

10. The method of claim 8, whereby the network node determines the size of said grant in relation to system load.

11. The method of claim 8, whereby the network node determines the size of said grant in relation to estimated channel quality.

12. A user equipment in a radio access network, said user equipment comprising:

a first electrical circuitry configured to ascertain, from a received initial uplink transmission grant with respect to a radio base station node, a size of the uplink transmission indicated therein;

the first electrical circuitry configured to determine whether the size of the uplink transmission indicated by the received initial uplink transmission grant allows transmission of a Radio Resource Control (RRC) Connection Request message and an initial Non-Access Stratum (NAS) message;

a transmitter part configured to, in response to a negative determination, send the RRC Connection Request message and no initial NAS message to the radio base station node, and a second electrical circuitry configured to, in response to a positive determination, to initiate a parallel transmission of the RRC Connection Request message and the initial NAS message.

13. The user equipment of claim 12, wherein the transmitter part is further configured to, in response to the negative determination, send an indication to transmit further data.

14. The user equipment of claim 13, whereby said indication to transmit further data is transmitted via a scheduling request.

15. The user equipment of claim 13, whereby said indication to transmit further data is transmitted in the same transmission as the RRC Connection Request.

16. The node in a radio access network, said node responsible for providing a connection setup possibility to the user equipment of claim 12, the node comprising:

a first electrical circuitry adapted to autonomously determine in said network node a size of a grant for uplink transmission of said user equipment based on cell-specific or load-specific parameters;

a second electrical circuitry adapted to assign in a random access response said grant to said user equipment; and the node to receive a Radio Resource Control (RRC) Connection Request message and an indication to transmit further data.

17. The node of claim 16, whereby said node is a radio base station.

18. The node of claim 16, the node further to receive both a Radio Resource Control (RRC) Connection Request message and a Non-Access Stratum message in parallel.

\* \* \* \* \*